May 24, 1938. E. V. McCOLLUM 2,118,441
METHOD OF MAKING GEOLOGICAL EXPLORATIONS
Filed Feb. 5, 1934
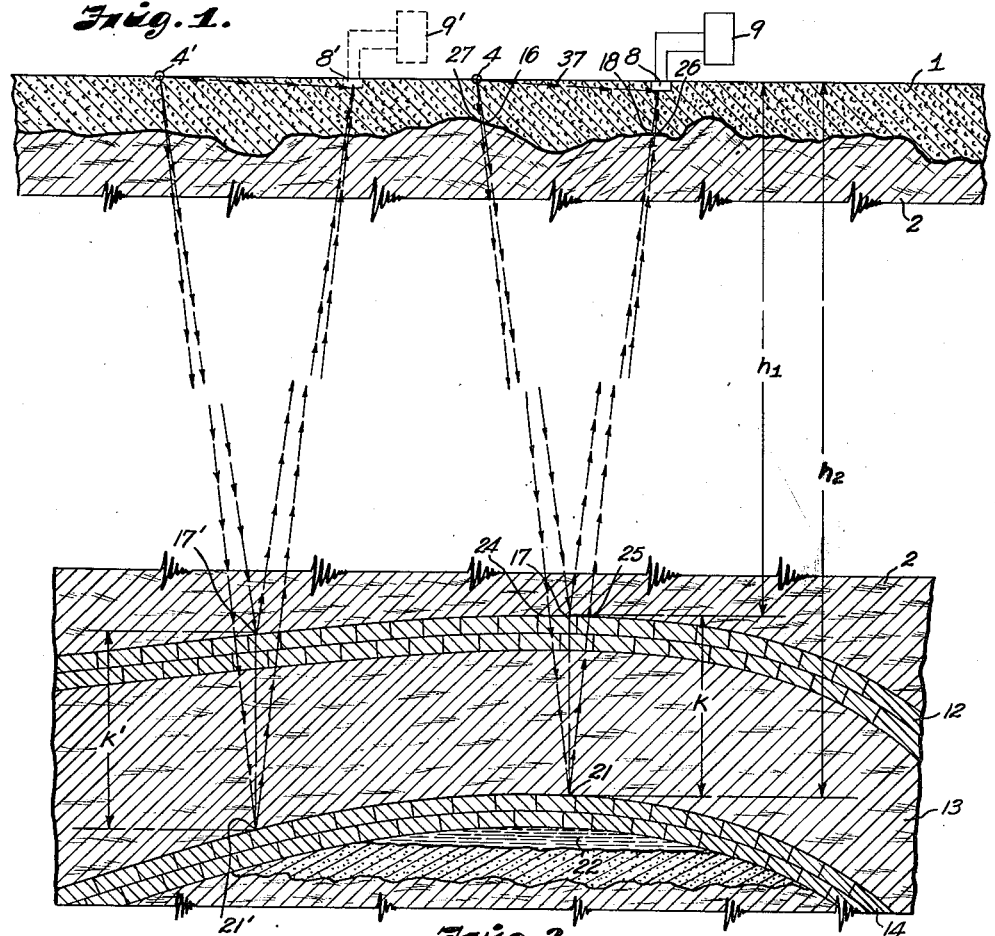
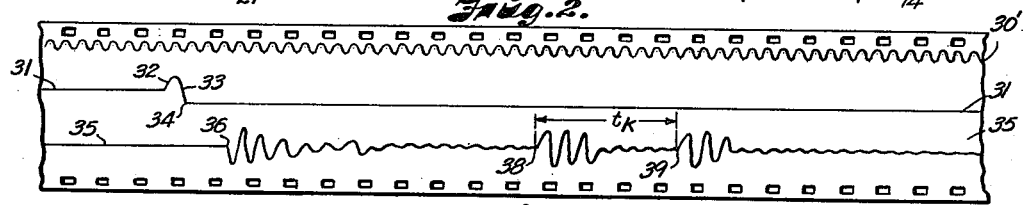
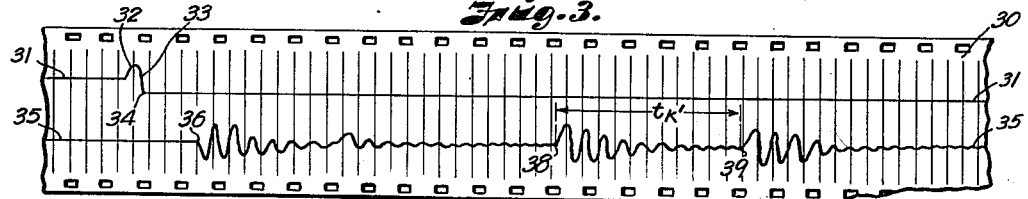
INVENTOR
Elton V. McCollum
BY
ATTORNEY Patented May 24, 1938

2,118,441

UNITED STATES PATENT OFFICE 2,118,441

METHOD OF MAKING GEOLOGICAL EXPLORATIONS

Elton V. McCollum, Ponca City, Okla., assignor to Continental Oil Company, Ponca City, Okla., a corporation of Delaware Application February 5, 1934, Serial No. 709,896

3 Claims. (Cl. 181—0.5)

My invention relates to a method of making geological explorations and more particularly to a method utilizing the principle that elastic waves can be economically produced at or near the earth's surface by explosives or other means and after passage by various paths through portions of the earth's crust, may be received by seismometers or similar devices and recorded by suitable means comprising photographic and other equipment located advantageously with respect to the source of the elastic waves.

Fortunately, the sedimentary portion of the earth's crust is stratified into well defined layers of materials having different physical characteristics. Knowledge of the time required for waves to traverse certain well defined paths and the physical constants of the various materials encountered in the different parts of the paths enables one qualified in the art to determine depths and slopes in certain localities with accuracies that had formerly been possible only by drilling or excavating operations. In the instant specification, waves are to be construed to include all elastic vibrations whether produced mechanically or by explosives. A source of error in the seismograph exploration methods of the prior art arises from the fact that the weathered portion of the earth's crust is extremely variable in thickness and possesses different varying physical characteristics. The determination of the thickness of the weathered layer and the time necessary for passage of sound through it has been done in a number of ways but accurate determinations are difficult, if not altogether impossible, in many localities. It has been suggested by the prior art that the source of the waves and the seismometers or other instruments suitable for reception of waves may be located below the weathered zone, by drilling through it and placing the wave source and receiving instruments down in the drilled holes. It is obvious such procedure makes geological explorations cumbersome and entails no inconsiderable expense.

One object of my invention is to provide a novel method wherein the interval between different geological beds can be accurately evaluated.

Another object of my invention is to provide a method of correctly determining the interval between beds which is substantially free from errors arising from heterogeneity in the weathered portion of the earth's crust.

A further object of my invention is to provide a method which is independent of the time of origin of the waves.

In the accompanying drawing which forms part of the instant specification and is to be read in conjunction therewith and in which like reference numerals are used to indicate like parts in the various views;

Figure 1 is a diagrammatic view showing a section of the earth's crust and selected paths of waves to and from geological layers.

Figure 2 is a diagrammatic view of a record made by a receiving equipment in the full line position.

Figure 3 is a diagrammatic view of a record made by a receiving equipment in the dotted line position.

For the sake of clearness and brevity the discussion, in the instant specification, will be mainly limited to one dimension, i. e., for the vertical reflection, it being understood that it is merely a matter of well known mathematical principles to extend the arguments to two or three dimensions.

In order to more clearly point out my invention, I shall consider, at this time, a method of the prior art in which a source of waves which may be an explosive charge 4, is shown located near the surface of the earth in the layer of weathered material 1. Such is not the only possible location, but is a convenient one. Likewise a detector of waves such as an electromagnetic seismometer of which there are many proven kinds is shown at 8 in the weathered zone. The detector is connected to the recording device 9, which ordinarily consists of proper amplifying and other electrical equipment together with an oscillographic camera. Many suitable forms of this equipment are well known to the art. When a source of waves, such as the detonation of an explosive, is placed at 4 and detonated, waves immediately are started in all directions. Various and devious paths are followed, some of which are shown in the drawing. Considering one of the simple paths shown, it is seen that the sound traverses the weathered zone 1 in the interval from 4 to 16 where it encounters unweathered rock 2, thence through the unweathered rock 2 to the point 17 where the sound comes into contact with layer 12 which differs in physical characteristics from layer 2. The physical change between layers 2 and 12 causes a portion of the sound to be reflected at 17, whence it passes again through layer 2 to 18, where the weathered material is again encountered. After traversing the weathered layer from 18 to 8 the sound is picked up by the seismometer at 8 and recorded by a recording device 9. The time taken to traverse the path described may be conveniently divided into two portions, i. e., $t_1$ the partial time of travel in the weathered portion with velocity $V_1$, and $t_2$ the partial time spent in passage through the layer of unweathered rock with velocity $V_2$. When the source of sound and detector are close together the equation giving the distance $h_1$ from the surface of the earth to bed 12 may be written as, $$h_1 = \tfrac{1}{2}(V_1 t_1 + V_2 t_2) \qquad (1)$$

The total observed time $t$ is $$t = t_1 + t_2 \qquad (2)$$

As stated above the approximate time taken for passage through the weathered layer may be obtained by a number of methods, but an inspection of Equation (1) shows that extreme accuracy must be obtained in evaluating $t_2$ in order to get a usable value of $h_1$, since $V_1$ and $V_2$ are ordinarily quite different.

It is obvious that if this operation is repeated at a number of places on the earth's surface a contour map can be constructed giving the true picture of a limestone or sandstone bed such as shown by 12 in the figure. Such maps are useful in the location of petroleum and other valuable mineral deposits.

In the preceding discussion, I have described but one of the many useful ways in which seismograph work has been done. The detector may be spaced an appreciable distance from the source of waves. A plurality of detectors may be used with one source of waves, or a plurality of wave sources may be used with one detector, or a plurality of wave sources may be used with a plurality of detectors. Reflection paths only have been discussed here but refraction or diffraction paths are often used advantageously as is well known in the art. But all previous seismograph methods have one thing in common, i. e., that the weathered layer furnishes a source of error which has heretofore been eliminated only by drilling through the weathered layer and placing of the sound sources and detectors into the unweathered layer beneath. Another common source of error in methods of seismograph exploration used heretofore arises because the instant of origin of the sound waves is often in doubt. This may be because of the fact that electrical blasting caps, which are ofttimes used, do not fire uniformly. Or at times a crash of static may interfere at the instant of blast, i. e. the instant of origin of the sound waves, when radio communication is being used.

In the Figure 1 of the drawing, I diagrammatically show the essential features of a typical geological cross section of an anticline or dome. Layer 1 is composed of weathered rock, silt, etc., that is variable in thickness and physical characteristics. Layer 2 is composed of unweathered rock of definite physical characteristics. Layer 13 is similar to 2. Layers 12 and 14 are of rock that is quite different physically from layers 11 and 13, such that sound will be reflected by them. Many more layers are generally present in a geological cross section but this simple case will be sufficient to illustrate my invention. The search for petroleum has for a number of years been to a great extent closely associated with exploration for anticlines or domes. Referring to Figure 1, it is shown that the beds 12 and 14 curve with the convex portion upward. A common place to find petroleum is in suitable sands or other rocks immediately underneath the anticline such as 22. A number of producing reservoirs at different depths is not uncommon. Another well known geological fact is that deeper beds generally exhibit more closure or steeper dips, such as may be seen by comparing beds 12 and 14. Since deeper beds dip at greater angles with respect to the horizontal than the shallower beds, it necessarily follows that the interval between two beds changes at different points with respect to the structure; such is shown by $k$ and $k'$. By plotting inter-layer intervals on maps and contouring them, subsurface structural conditions may be studied. My invention furnishes a method of determining such intervals.

More particularly referring now to the drawing, a source of waves, such as an explosive charge, stationed at 4 sends out waves in all directions, a portion of which substantially follows the paths as depicted in Figure 1. The path 4, 16, 17, 18, 8, has been described above. A portion of the waves suffers reflection at 17 when it comes into contact with bed 12, but another portion is transmitted still deeper into the earth where eventually it comes into contact with bed 14 at 21, from which part of the waves is reflected back toward the earth's surface while a fraction of it continues still deeper. The portion reflected at 21 passes back up through beds 13, 12, 2 and 1 and is received by a seismograph at 8, after which it is recorded by suitable equipment 9, preferably of the photographic type, which equipment is well known to the art.

When the seismograph 8 is fairly close to the sound source 4 the distance $h_1$ from the earth's surface to bed 12 may be written as, Equation (1) above, namely, $$h_1 = \tfrac{1}{2}(V_1 t_1 + V_2 t_2) \qquad (1)$$

where $V_1$ = velocity in unconsolidated layer 1.
$V_2$ = velocity in unweathered layer 2.
$t_1$ = time taken for sound traveling in layer 1.
$t_2$ = time taken for sound traveling in layer 2.

Similarly the distance $h_2$ from the earth's surface to layer 14 in which sound traverses the path 4, 27, 24, 21, 25, 26, 8 is $$h_2 = \tfrac{1}{2}(V_1 t_1 + V_2 t_2 + V_k t_k) \qquad (3)$$

where $V_k$ = effective velocity of sound from top of layer 12 to top of layer 14.

$t_k$ = time taken for sound traveling in layers 12 and 13.

By definition, $$k = h_2 - h_1 \qquad (4)$$

Substitution of Equations (2) and (3) into (4) gives the thickness, $$k = \tfrac{1}{2} V_k t_k \qquad (5)$$

Equation (5) gives the interval between the two reflecting beds independent of the weathered layer. Furthermore the total time is not necessary; the relative time between the two reflections is sufficient, since only the relative time $t_k$ appears in Equation (5).

By repeating the observation just described at other points, such as with the equipment in the dotted line position, 4', 8', other values of the interval may be obtained such as $k'$. The placing of these intervals at the proper locations on maps and contouring them is of much value geologically as was pointed out above.

Figure 2 is the seismogram taken at 8 and Figure 3, that taken at 8'. Figures 2 and 3 will further clarify my invention. There are depicted 7 the essential features of two seismograms such as might be obtained by placing of seismograph apparatus at the proper positions to evaluate $k$ and $k'$ of Figure 1. A seismogram ordinarily consists of a segment from a roll of photographic film or paper which has been driven along at a fairly uniform speed by a rotating drum or other device, and on which has been photographed, (Figure 2) by means of oscillographs or galvanometers, time signals and various arrivals from the seismometers. The thin parallel lines shown in Figure 3 to divide the seismogram into equal time intervals, may be put on by a synchronous motor driven by a tuning fork, or other well known methods. A common interval between the lines 30 and/or like points on adjacent sine curves of track 30', is .01 sec., but it may be advantageous at times to select other intervals. The track 31 in Figures 2 and 3 represents an oscillographic trace that gives the origin of time of the sound waves, as is shown by the break in the line.

The upward break 32 is caused by the closing of the firing circuit. The downward dip 33 is caused by the breaking of the bridge wire in the detonating cap. It will be observed that the explosion may take place when the circuit is closed, when the bridge wire breaks or at some indeterminable time thereafter as in the case of a hang fire. This is governed by a number of factors which are unknown, as for example the composition, state, age, and temperature of the primer charge, the mechanical construction of the detonating cap, the character and condition of the booster charge of the cap, the character, condition, tamping and placing of the main charge, the voltage used, and the condition, composition, and length of the bridge wire. These variables may occasion a serious inaccuracy in time of origin of the waves if an arbitrary point on the track 31 is assumed, as for example the point 34 when the bridge wire is broken. It will be understood that the velocity of the waves is high and a small error in time, seriously affects the accuracy of the results obtained.

The track 35 in Figures 2 and 3 represents the incoming signals furnished by the seismometer 8. Point 36 gives the instant of arrival of the wave 37 traveling near the surface of the earth. At a later time reflected energy from 12 will arrive at the seismometer and will be recorded on the seismogram at 38. At a still later time reflected energy from bed 14 will arrive at the seismometer and will be recorded on the seismogram at 39. In Figure 2 the same reference characters have been used to designate the corresponding characteristics shown in Figure 3.

Referring to Figure 2 it will be seen that the total times of travel of sound by various paths may be obtained by starting at point 34 and counting the timing lines and fractions thereof out to the various arrivals on the record. It will be appreciated that the errors introduced by the uncertainty of the time of origin and lack of knowledge of the characteristics of the weathered layer, will introduce an error. By my method the interval between two beds is desired, and only the portion of the timing marks between 38 and 39 need be counted. The time interval between 38 and 39 is the $t_k$ contained in Equation (5). It is easy to see that such a time interval is independent of the instant that the waves start, and therefore if the instant 34 is in error due to heterogeneity in the firing of electrical blasting caps or other causes, the accuracy of the determination of the interval $k$ does not suffer therefrom.

The interval of time $t_k'$ of Figure 3 is shown to be greater than $t_k$, corresponding to the greater value of the geological interval $k'$ over $k$.

In the description of my invention I have, for the sake of simplicity, restricted myself to a simple case but it is to be understood that the method can be used in more complicated cases. It takes merely a knowledge of the well known physical laws governing sound paths in connection with my method which I have herein described to extend the method to paths that take two or three mathematical dimensions to describe them. I have only mentioned one wave source and one seismograph but at times it may be advantageous to use a plurality of either or both. Likewise the location of sound sources and seismographs does not necessarily have to be restricted. Furthermore I do not wish to limit the method of determination of intervals between only two beds of a geological section. Obviously the method may be applied to a plurality of combinations where several good reflecting beds exist.

Having thus described my invention, what I claim is:

1. A method of measuring intervals between buried geological layers from the earth's surface including the steps of generating waves at or near the earth's surface, receiving reflections of waves from buried geological layers at a point at or near the earth's surface positioned close enough to the wave source to subtend small angles at the points on the geological layers from which reflections take place, measuring the time difference between reflections from separated geological layers, and determining the interval between said layers irrespective of the time of origin of the waves.

2. In a method of making geophysical explorations by obtaining relative intervals between buried geological layers at a plurality of points therealong, the steps of generating waves at or near the earth's surface, receiving reflections of waves from buried geological layers at a point at or near the earth's surface positioned a given distance from the wave source, measuring the time difference between reflections from separated geological layers, and obtaining a relative proportional interval between said layers as a function of the time difference irrespective of the time of origin of the waves, then generating further waves at a point separated from said first wave generating point and receiving reflections of said waves at a point removed from said second wave source a distance substantially equal to the distance between said first wave source and said first wave receiving point, receiving waves reflected from buried geological layers at said second wave receiving point, measuring the time difference between said second reflections and obtaining a second proportional interval between said layers as a function of the time difference irrespective of the time of origin of said second waves.

3. In a method of making geophysical explorations by obtaining relative intervals between buried geological layers at a plurality of points therealong, the steps of generating waves at or near the earth's surface, receiving reflections of waves from buried geological layers at a point at or near the earth's surface, measuring the time difference between reflections from separated geological layers, obtaining a relative proportional interval between said layers as a function of the time difference irrespective of the time of origin of the waves, then generating further waves at a point separated from said first wave generating point and receiving reflections of said waves at a second point, receiving waves reflected from buried geological layers at said second wave receiving point, measuring the time difference between said second reflections and obtaining a second proportional interval between said layers as a function of the time difference irrespective of the time of origin of said second waves.

ELTON V. McCOLLUM.